United States Patent

Lazarus

(10) Patent No.: US 7,710,586 B2
(45) Date of Patent: May 4, 2010

(54) SYSTEM AND METHOD FOR SUPPORTING PRINTER FEATURES IN AN IPDS PRINTING ENVIRONMENT

(75) Inventor: Lewis James Lazarus, Torrance, CA (US)

(73) Assignee: Xerox Corporation, Stamford, CT (US)

( * ) Notice: Subject to any disclaimer, the term of this patent is extended or adjusted under 35 U.S.C. 154(b) by 1051 days.

(21) Appl. No.: 11/405,768

(22) Filed: Apr. 18, 2006

(65) Prior Publication Data

US 2007/0242298 A1    Oct. 18, 2007

(51) Int. Cl.
 *G06F 15/00* (2006.01)
 *G06F 17/00* (2006.01)

(52) U.S. Cl. ..................... 358/1.14; 715/234

(58) Field of Classification Search ............... 358/1.14, 358/1.15, 1.13, 1.16, 1.18, 406, 3.14, 400; 715/234, 781, 804, 853; 714/15, 41, 33, 714/42; 710/5, 8, 15, 52
See application file for complete search history.

(56) References Cited

U.S. PATENT DOCUMENTS

| | | | | |
|---|---|---|---|---|
| 6,631,007 | B1 * | 10/2003 | Buis et al. | 358/1.13 |
| 2007/0236723 | A1 * | 10/2007 | Gaertner et al. | 358/1.15 |
| 2009/0147304 | A1 * | 6/2009 | Saito | 358/1.15 |

* cited by examiner

*Primary Examiner*—Saeid Ebrahimi Dehkordy
(74) *Attorney, Agent, or Firm*—Carter, DeLuca, Farrell & Schmidt, LLP

(57) ABSTRACT

A system and method are provided for supporting printer-based features in an IPDS printing environment. The system and method enable the printer to assign logical page identifiers to IPDS pages and track them internally. The printer only reports status to the host computer for pages flagged as host generated pages. Printer generated pages are not included in IPDS page counts. This enables one to invoke advanced printer-based features at the printer without corrupting the counts used by the host computer for error recovery and print job management in the IPDS printing environment.

17 Claims, 2 Drawing Sheets

SYSTEM AND METHOD FOR SUPPORTING PRINTER FEATURES IN AN IPDS PRINTING ENVIRONMENT

BACKGROUND

The present disclosure relates to printing systems, more specifically, to a system and method for supporting value added printer features, such as N-1 printing and imposition, in an IPDS (Intelligent Printer Data Stream) printing environment.

IPDS is an IBM printer data stream protocol designed to manage and control printer processes using a mainframe host interface or Print Service Facility (PSF). IPDS is both a page-description language and a printer-control protocol. IPDS is distinguished from other data streams for printers because it provides all-points addressability, error recovery and two-way communications between the printer and PSF or host computer (e.g., mainframe computer). Also, IPDS provides data stream compatibility across the IPDS product line independent of speed, physical attachment or rendering technology.

IPDS error recovery assists the customer by providing improved system management and printer operations. For example, the operator is notified by the printer and PSF when human intervention in the print process is required. The notification process provides a clear direction of what is needed to correct the printing process, such as font availability notification or paper supply out messages.

PSF provides the customer with transparent resource management by tracking fonts, page segments, overlays, images, and resource data objects and sending them to the printer as required.

The two-way communication at the data stream level provided by IPDS helps synchronize operating system and printer processes, exchanges query-reply information and returns detailed exception information. This function provides the customer with improved printer operations and easier problem identification and resolution.

The printers generally use a subset of the total set of IPDS commands to manage their operations. These commands within the data stream enable the system to control the media-handling capabilities of the printer (request duplexing, select paper sources, and offset printing jobs from each other) and other operations dealing with paper. The commands also provide the means for managing the downloading of fonts and stored objects, such as overlays and page segments, which are required to print an application.

In an IPDS printing environment, IPDS assumes that the printer is a simple page printer, and all advanced features are controlled from the PSF or host computer. Some modern printer controllers, such as DocuSP®, provide many advanced features at the printer. Many of these features either have no equivalent mainframe interface, or are more convenient to use from the printer console, rather than from the PSF or host computer.

However, a problem that arises when using these advanced features at the printer console is that IPDS uses a page counting algorithm in which the printer reports to the PSF or host computer how many pages it has received, stacked, and committed for printing by a print engine. Advanced features which change the number of physical pages printed can affect the page counts reported to the PSF or host computer, causing IPDS error recovery to fail, and causing other job management problems at the PSF or host computer.

The following options are typically available to prevent IPDS error recovery from failing: (1) do not offer advanced printer-based features with printing systems that support IPDS; (2) suppress the advanced printer-based features; (3) inform users not to make use of existing advanced printer-based features with IPDS; and/or (4) internally adjust page counts to support specific advanced printer-based features. For example, DocuSP® IPDS suppresses certain DocuSP® advanced printer-based features in the IPDS printing environment, while it informs users not to use other advanced printer-based features.

Based on the above background information, a need exists for enabling the use of advanced printer-based features at the printer in an IPDS printing environment.

SUMMARY

According to the present disclosure, a system and method are provided for supporting printer-based features in an IPDS printing environment. The present disclosure calls for the printer to assign logical page identifiers to IPDS pages and track them internally. The printer only reports status to the PSF or host computer for pages flagged as host generated pages. Printer generated pages, such as banners, multiple copies, slip sheets, inserts, sample sheets, etc., are not included in IPDS page counts. This enables the user to invoke advanced printer-based features at the printer without corrupting the counts used by the host computer for error recovery and print job management in the IPDS printing environment.

Furthermore, the system and method in accordance with the present disclosure makes it possible to use printer-based features, such as N-1 printing and imposition, which reorder output pages, in an IPDS printing environment which is not possible using conventional printing schemes. Additionally, the system and method in accordance with the present disclosure makes it possible to perform printer-based logical page processing, which combines two or more logical pages on a single side of a physical sheet of paper, without affecting the page counts reported to the host computer.

According to the present disclosure, a printing system for supporting printer based features which change the number of physical pages printed by a print engine of the printing system in an IPDS printing environment is provided. The printing system includes a printer controller having at least one processor for executing application software for associating an IPDS logical page identifier (ILPID) with each physical page of a print job received from an IPDS host computer; determining a page count value based on the number of ILPIDs; and reporting the determined ILPID-based page count value rather than a physical page count value to the IPDS host computer.

In an exemplary process, the at least one processor determines a page count value based on the number of ILPIDs by executing the application software for processing each physical page associated with an ILPID to determine if at least one logical page is imposed on said processed physical page; concatenating at least one ILPID associated with the at least one logical page into an ILPID associated with the corresponding physical page, if it is determined that at least one logical page is imposed on said processed physical page; and counting the complete number of ILPIDs associated with physical pages following the processing and concatenating steps to obtain the ILPID-based page count value.

The at least one processor further executes the application software for communicating ILPID data to a gateway as at least one of individual pages and groups of pages committed for printing, or stacked, by the print engine; and analyzing the ILPID data by the gateway for determining the ILPID-based page count value. The at least one processor analyzes the ILPID data by executing the application software for determining whether physical pages were reordered for N-1 printing or imposition; and waiting until a compete sequence of pages in 1-N order can be reported before informing the host computer that pages have been committed for printing or stacked by the print engine, if it is determined that the physical pages were reordered for N-1 printing or imposition.

The present disclosure also provides a method for an IPDS printing environment having an IPDS host computer in communication with a printer controller of a printing system. The method provides for supporting printer based features which change the number of physical pages printed by a print engine of the printing system. The method includes associating an IPDS logical page identifier (ILPID) with each physical page of a print job received from the IPDS host computer; determining a page count value based on the number of ILPIDs; and reporting the determined ILPID-based page count value rather than a physical page count value to the IPDS host computer.

In an exemplary process, the step of determining includes processing each physical page associated with an ILPID to determine if at least one logical page is imposed on said processed physical page; concatenating at least one ILPID associated with the at least one logical page into an ILPID associated with the corresponding physical page, if it is determined that at least one logical page is imposed on said processed physical page; and counting the complete number of ILPIDs associated with physical pages, following the processing and concatenating steps to obtain the ILPID-based page count value.

The step of reporting includes communicating ILPID data to a gateway as at least one of individual pages and groups of pages committed for printing, or stacked, by the print engine; and analyzing the ILPID data by the gateway for determining the ILPID-based page count value. The analyzing step includes determining whether physical pages were reordered for N-1 printing or imposition; and waiting until a compete sequence of pages in 1-N order can be reported before informing the host computer that pages have been committed for printing or stacked by the print engine, if it is determined that the physical pages were reordered for N-1 printing or imposition.

The present disclosure also provides a computer-readable storage medium storing a set of programmable instructions capable of being executed by at least one processor for performing the method in accordance with the present disclosure.

BRIEF DESCRIPTION OF THE DRAWINGS

Various embodiments of the present disclosure will be described herein below with reference to the figures wherein.

DETAILED DESCRIPTION

Embodiments of the present disclosure will be described herein below with reference to the accompanying drawings. In the following description, well-known functions or constructions are not described in detail to avoid obscuring the present disclosure in unnecessary detail.

The word "printer" and terms "printing environment" and "printing system" as used herein encompasses any apparatus and/or system, such as a digital copier, xerographic and reprographic printing systems, bookmaking machine, facsimile machine, multi-function machine, etc. which performs a print outputting function for any purpose.

According to the present disclosure, a system and method are provided for supporting printer-based features in an IPDS printing environment. The present disclosure calls for the printer to assign logical page identifiers to IPDS pages and track them internally. The printer only reports status to the Print Service Facility (PSF) or host computer for pages flagged as host generated pages. Printer generated pages, such as banners, multiple copies, slip sheets, inserts, sample sheets, etc., are not included in IPDS page counts. This enables the user to invoke advanced printer-based features at the printer without corrupting the counts used by the host computer for error recovery and print job management in the IPDS printing environment.

Figure 1:
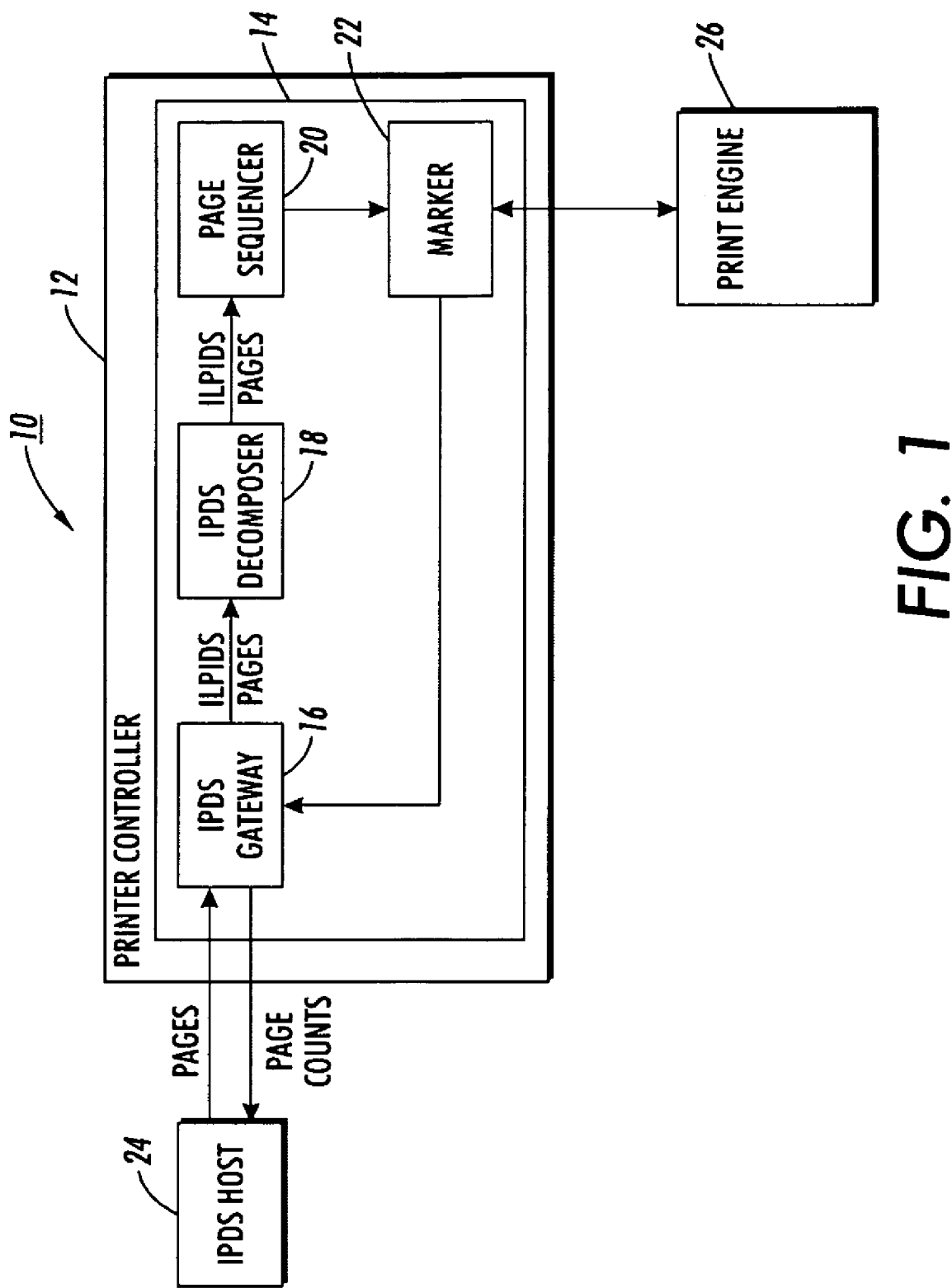
FIG. 1 is a block diagram of an IPDS printing system in accordance with the present disclosure.
Figure 2:
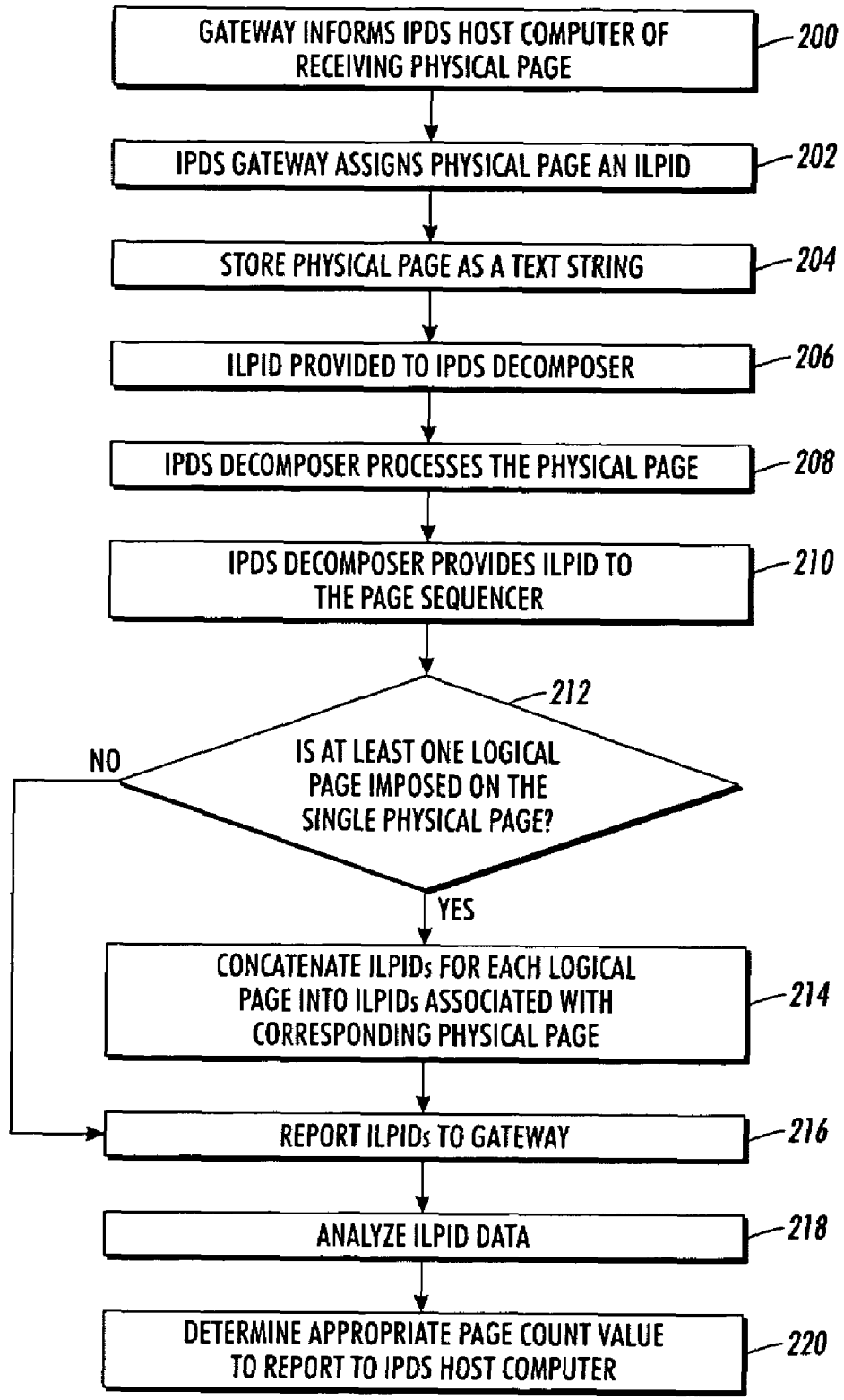
FIG. 2 is a flow chart illustrating a method for invoking printer-based features in an IPDS printing environment in accordance with the present disclosure.

Referring now to FIGS. 1 and 2, there are shown respectively a block diagram of an exemplary IPDS printing system and a method in accordance with the present disclosure. The exemplary system and method of the present disclosure will now be described in detail with reference to these figures. The system of the present disclosure designated generally by reference numeral 10 includes a printing system 11 having a printer controller 12 and a print engine 26.

The printer controller 12 has at least one processor 14. The at least one processor 14 includes an IPDS gateway 16, an IPDS decomposer 18, a page sequencer 20, and a marker 22 whose functions are described herein below for performing the method according to the present disclosure.

The at least one processor 14 performs the functions and steps described herein below for the method according to the present disclosure. In particular, the at least one processor 14 executes application software having a series of programmable instructions for performing the functions of the system and method according to the present disclosure. The application software can be stored on a computer-readable medium, such as a CD-ROM, DVD, hard drive, and diskette.

It is contemplated that the at least one processor can be embedded within at least one of the IPDS gateway 16, the IPDS decomposer 18, the page sequencer 20, and the marker 22. It is further contemplated that the IPDS gateway 16, IPDS decomposer 18, page sequencer 20, and marker 22 can be configured as software, firmware and/or hardware.

As shown by FIG. 1, the printer controller 12 communicates with an IPDS host computer 24 and the print engine 26. The printer controller 12 and print engine 26 are components of a printer, such as a DocuSP® printer, having advanced printer-based features, such as N-1 printing and imposition.

In operation, the IPDS gateway 16 informs the IPDS host computer 24 when it receives a physical page. The IPDS gateway 16 assigns the physical page it receives an IPDS logical page ID (ILPID) and stores the physical page as a text string in the control structure for the physical page. The ILPID for each physical page is then provided to the IPDS decomposer 18 along with other page data. When the IPDS decomposer 18 completes processing the physical page, the IPDS decomposer 18 provides the ILPID to the page sequencer 20, along with the control data for the decomposed physical page. If at least one logical page is imposed on the single physical page, then, at this point, the ILPIDs for each logical IPDS page are simply concatenated or correlated by the page sequencer 20 into the ILPID assigned or belonging to the corresponding physical page.

Instead of concatenating at least one ILPID associated with the at least one logical IPDS page into an ILPID associated with the corresponding physical page, another approach is to obtain a similar effect from creating a list or some other collection of ILPIDs. For instance, an object oriented implementation can be developed using a Page Object to represent each page. The Page Object could have an ILPID attribute, containing the value for the page, and the Page Object could provide methods to Get, Set, and Append to the page's ILPID information. Still, another approach is to use a list of integers, in which each entry corresponds to an ILPID. Such a list could be of variable length, if supported by the implementation language, or could use a zero-filled entry to signal the end of the valid data. Alternatively, in another approach, a linked list can be used to represent the collected ILPIDs for a page. In this case, each node in the list consists of an ILPID in the form of an integer, and a pointer to the next node. These are alternate to concatenating each ILPID for collecting the ILPIDs for each physical page. Which ever approach is utilized, the system and method according to the present disclosure collect the ILPIDs for each physical page.

When the printing system generates pages (e.g., banners, multiple copies, slip sheets, inserts, sample sheets, etc.), it does not provide ILPIDs for them. Since only pages received from the IPDS host are tagged with ILPIDs, the count of ILPIDs for a set of physical pages can be used to determine the count of IPDS logical pages associated with them.

For example, the host computer 24 may intend a series of pages to print single sided, but a user (queue override) setting may force these pages to print on both sides of the physical media. In this case, simply using the count of physical sheets to derive the page count to report to the host computer 24 would produce an incorrect result. Instead, by counting the ILPIDs processed with the set of physical sheets, the gateway is able to determine the correct number of logical IPDS pages to acknowledge. Similarly, user settings may force a job to print in reverse (N-1) order. Even if the count of pages is correct, the order is important, because the host computer 24 uses the count of pages to determine the point at which to resume processing for recovery, in the event of a system failure. In this case, the IPDS gateway 16 uses the ILPIDs to ensure that the committed and stacked page counts reported to the host computer 24 reflect complete groups of pages that are contiguous with the pages preceding them, in order to guarantee that host recovery will function correctly, in the event of a system failure.

The marker 22 interfaces with the print engine 26 and communicates or reports the appropriate ILPIDs back to the IPDS gateway 16 as at least one of individual pages and groups of pages which are committed for printing by the print engine 26, or stacked, by the print engine 26. The IPDS gateway 16 analyzes the ILPID data received from the marker 22, and uses the analyzed ILPID data to determine the appropriate page count values to return to the IPDS host computer 24. In particular, the gateway 16 counts the complete number of ILPIDs associated with physical pages to obtain an ILPID-based page count value for reporting to the host computer 24. Since printing system or printer generated pages are not assigned an ILPID (since they are not received from the host computer), they cannot be confused with IPDS pages, and will not be included in the page counts that the IPDS gateway 16 returns to the IPDS host computer 24 as the print job progresses.

In addition, the IPDS gateway 16 can use the ILPIDs to determine whether pages were reordered for N-1 printing, or imposition. If so, the IPDS gateway 16 will wait until a complete sequence of pages in 1-N order can be reported, before informing the host computer 24 that pages have been committed for printing by the print engine 26 or stacked by the print engine 26. This allows these features to be used without compromising the integrity of IPDS error recovery, which depends on a simple, accumulated page count, and does not track the state of individual pages.

With reference to FIG. 2, there is shown a flowchart illustrating the method according to the present disclosure. At step 200, the IPDS gateway 16 informs the IPDS host computer 24 that it received a physical page. At step 202, the IPDS gateway 16 assigns the physical page it received an IPDS logical page ID (ILPID) and, at step 204, the IPDS gateway 16 stores the physical page as a text string in the control structure for the physical page.

At step 206, the ILPID for each physical page is then provided to the IPDS decomposer 18 along with other page data. At step 208, the IPDS decomposer 18 processes the physical page, and, at step 210, the IPDS decomposer 18 provides the ILPID to the page sequencer 20, along with the control data for the decomposed physical page. The process then proceeds to step 212, where it is determined if at least one logical page (e.g., banners, multiple copies, slip sheets, inserts, sample sheets, etc.) is imposed on the single physical page. If yes, then at step 214, the ILPIDs for each logical page are concatenated or correlated into the ILPID associated or belonging to the corresponding physical page and the process proceeds to step 216. If no, then the process bypasses step 214 and proceeds to step 216.

At step 216, the marker 22 interfaces with the print engine 26 and communicates or reports the appropriate ILPIDs back to the IPDS gateway 16 as at least one of individual pages and groups of pages which are committed for printing by the print engine 26, or stacked, by the print engine 26. At step 218, the IPDS gateway 16 analyzes the ILPID data received from the marker 22, and, at step 220, uses the analyzed ILPID data to determine the appropriate page count values to return to the IPDS host computer 24. In particular, the gateway 16, at step 220, counts the complete number of ILPIDs associated with physical pages to obtain the ILPID-based page count value for reporting to the host computer 24.

As stated above, since printing system or printer generated pages are not assigned an ILPID (since they are not received from the host computer), they cannot be confused with IPDS pages, and will not be included in the page counts that the IPDS gateway 16 returns to the IPDS host computer 24 as the print job progresses. In addition, the IPDS gateway 16 can use the ILPIDs to determine whether pages were reordered for N-1 printing, or imposition. If so, the IPDS gateway 16 will wait until a complete sequence of pages in 1-N order can be reported, before informing the host computer 24 that pages have been committed for printing by the print engine 26 or stacked by the print engine 26. This allows these features to be used without compromising the integrity of IPDS error recovery, which depends on a simple, accumulated page count, and does not track the state of individual pages.

The system and method of the present disclosure allow a user of a printer having advanced features, such as a DocuSP® printer, to use a large part of these advanced printer-based features, such as the rich DocuSP® feature set, with IPDS print jobs. This level of functionality will set DocuSP® printers and other printers having advanced features apart from the majority of IPDS printers in an IPDS printing environment. In addition, the system and method of the present disclosure promote system coherence and ease of use, by making it possible to program print queues for IPDS consistently with other page description languages.

Furthermore, the system and method in accordance with the present disclosure makes it possible to use printer-based features, such as N-1 printing and imposition, which reorder output pages, in an IPDS printing environment which is not possible using conventional printing schemes. Additionally, the system and method in accordance with the present disclosure makes it possible to perform printer-based imposition or logical page processing, which combines two or more logical pages on a single side of a physical sheet of paper, without affecting the page counts reported to the host computer.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. In an IPDS Printing environment having an IPDS host computer in communication with a printer controller of a printing system, a method for supporting printer based features which change the number of physical pages printed by a print engine of the printing system, the method comprising:
   associating an IPDS logical page identifier (ILPID) with each physical page of a print job received from the IPDS host computer;
   determining a page count value based on the number of ILPIDs; and
   reporting (i) the determined ILPID-based page count value rather than a physical pane count value to the IPDS host computer and (ii) a select number of physical pages of the print job that are flagged as IPDS host computer generated pages, wherein the step of determining comprises:
   processing each physical page associated with an ILPID to determine if at least one logical page is imposed on said processed physical page;
   concatenating at least one ILPID associated with the at least one logical page into an ILPID associated with the corresponding physical page, if it is determined that at least one logical page is imposed on said processed physical page; and
   counting the complete number of ILPIDs associated with physical pages following the processing and concatenating steps to obtain the ILPID-based page count value.

2. The method according to claim 1, wherein the method is performed by at least one processor of the printer controller executing application software.

3. The method according to claim 1, wherein the step of associating is performed by a gateway of the printer controller, said gateway being in communication with the IPDS host computer for receiving physical pages of said print job from the IPDS host computer and reporting the determined ILPID-based page count value to the IPDS host computer.

4. The method according to claim 1, wherein the step of reporting comprises:
   communicating ILPID data to a gateway as at least one of individual pages and groups of pages committed for printing, or stacked, by the print engine; and
   analyzing the ILPID data by the gateway for determining the ILPID-based page count value.

5. The method according to claim 4, wherein the analyzing step comprises:
   determining whether physical pages were reordered for N-1 printing or imposition; and
   waiting until a complete sequence of pages in 1-N order can be reported before informing the host computer that pages have been committed for printing or stacked by the print engine, if it is determined that the physical pages were reordered for N-1 printing or imposition.

6. The method according to claim 1, wherein the printing system is a xerographic printing system.

7. A printing system for supporting printer based features which change the number of physical panes printed by a print engine of the printing system in an IPDS printing environment, the printing system comprising:
   a printer controller having at least one processor for executing application software for performing the method comprising:
   associating an IPDS logical page identifier (ILPID) with each physical page of a print job received from an IPDS host computer;
   determining a page count value based on the number of ILPIDs; and
   reporting (i) the determined ILPID-based page count value rather than a physical page count value to the IPDS host computer and (ii) a select number of physical pages of the print job that are flagged as IPDS host computer generated pages, wherein the at least one processor executes the application software for:
   processing each physical page associated with an ILPID to determine if at least one logical page is imposed on said processed physical page;
   concatenating at least one ILPID associated with the at least one logical page into an ILPID associated with the corresponding physical page, if it is determined that at least one logical page is imposed on said processed physical page; and
   counting the complete number of ILPIDs associated with physical pages following the processing and concatenating steps to obtain the ILPID-based page count value.

8. The printing system according to claim 7, wherein the printer controller further comprises a gateway, said gateway being in communication with the IPDS host computer for receiving physical pages of said print job from the IPDS host computer and reporting the determined ILPID-based page count value to the IPDS host computer.

9. The printing system according to claim 7, wherein the at least one processor executes the application software for:
   communicating ILPID data to a gateway as at least one of individual pages and groups of pages committed for printing, or stacked, by the print engine; and
   analyzing the ILPID data by the gateway for determining the ILPID-based page count value.

10. The printing system according to claim 9, wherein the at least one processor executes the application software for:
    determining whether physical pages were reordered for N-1 printing or imposition; and
    waiting until a compete sequence of pages in 1-N order can be reported before informing the host computer that pages have been committed for printing or stacked by the print engine, if it is determined that the physical pages were reordered for N-1 printing or imposition.

11. The printing system according to claim 7, wherein the printing system is a xerographic printing system.

12. A computer-readable storage medium storing a set of programmable instructions capable of being executed by at least one processor for performing a method enabling printer based features which change the number of physical pages printed by a print engine of a printing system to be supported in an IPDS printing environment, the method comprising:

associating an IPDS logical page identifier (ILPID) with each physical page of a print job received from an IPDS host computer;

determining a page count value based on the number of ILPIDs; and reporting (i) the determined ILPID-based page count value rather than a physical page count value to the IPDS host computer and (ii) a select number of physical pages of the print job that are flagged as IPDS host computer generated pages, wherein the step of determining comprises:

processing each physical page associated with an ILPID to determine if at least one logical page is imposed on said processed physical page;

concatenating at least one ILPID associated with the at least one logical page into an ILPID associated with the corresponding physical page, if it is determined that at least one logical page is imposed on said processed physical page; and counting the complete number of ILPIDs associated with physical pages following the processing and concatenating steps to obtain the ILPID-based page count value.

13. The computer-readable storage medium according to claim 12, wherein the step of associating is performed by a gateway of the printer controller, said gateway being in communication with the IPDS host computer for receiving physical pages of said print job from the IPDS host computer and reporting the determined ILPID-based page count value to the IPDS host computer.

14. The computer-readable storage medium according to claim 12, wherein the step of reporting comprises:

communicating ILPID data to a gateway as at least one of individual pages and groups of pages committed for printing, or stacked, by the print engine; and analyzing the ILPID data by the gateway for determining the ILPID-based page count value.

15. The computer-readable storage medium according to claim 14, wherein the analyzing step comprises:

determining whether physical pages were reordered for N-1 printing or imposition; and waiting until a compete sequence of pages in 1-N order can be reported before informing the host computer that pages have been committed for printing or stacked by the print engine, if it is determined that the physical pages were reordered for N-1 printing or imposition.

16. The computer-readable storage medium according to claim 12, wherein the printing system is a xerographic printing system.

17. The computer-readable storage medium according to claim 12, wherein the computer-readable storage medium is selected from the group consisting of CD-ROM, DVD, hard drive and diskette.

* * * * *